Sept. 3, 1957   H. R. CARPER   2,804,893
POWER ACTUATED BLOCK CLAMPING APPARATUS AND METHOD
Filed June 8, 1953

INVENTOR.
HAROLD R. CARPER,
BY
ATTORNEYS.

United States Patent Office 2,804,893
Patented Sept. 3, 1957

2,804,893
POWER ACTUATED BLOCK CLAMPING APPARATUS AND METHOD

Harold R. Carper, Indianapolis, Ind., assignor, by direct and mesne assignments, of thirty-five and twenty thirty-sixths percent to Carl F. Spickelmier, thirty-two and eight thirty-sixths percent to Edith S. Greer, and thirty-two and eight thirty-sixths percent to Betty S. Spicklemire, all of Indianapolis, Ind.

Application June 8, 1953, Serial No. 360,315

5 Claims. (Cl. 144—303)

This invention relates to a method and apparatus for use in manufacturing reinforced concrete slabs or beams composed of a row of individual blocks secured together by longitudinally extending reinforcing members. In the manufacture of such slabs, it is common to arrange in a row the number of blocks necessary to produce a slab of the desired length and to dispose the reinforcing members in aligned openings or grooves with which the blocks are provided. Clamping members disposed at the ends of the row are forced toward each other, and a longitudinal clamping effort is applied to the slab through the medium of a clamp rod which extends through the clamping members and through voids in the blocks. After the clamping effort has been applied, the reinforcing members are grouted in place, and the clamping effort is maintained until the grouting has cured.

It is an object of this invention to provide an improved means for applying and maintaining the aforesaid clamping effort. A further object of the invention is to provide a method and a simple and economically manufactured power-operated clamping mechanism which can be operable to apply to the slab a clamping effort which can be controlled in magnitude with a reasonable degree of accuracy. A further object of the invention is to provide a simple and effective means for maintaining during curing of the grouting the controlled clamping effort which has been applied by other means.

In carrying out the invention in its preferred form, the clamp rod which extends through the slab and the clamping members is provided at one end with a head adapted for releasable attachment to a hydraulic mechanism operable to act between the head and the adjacent clamping member to impose a clamping effort of controlled magnitude. To retain the clamping effort after its application by the hydraulic mechanism, the head on the clamp rod is provided with a transverse slot adapted to receive a wedge-like key which, when driven home, reacts on the adjacent clamping member and maintains the clamp rod under tension. In the preferred mode of operating such apparatus, the wedge is tightened until a predetermined drop in the clamping effort exerted by the hydraulic mechanism has been effected.

The accompanying drawing illustrates a preferred form of the invention:

Figure 1:
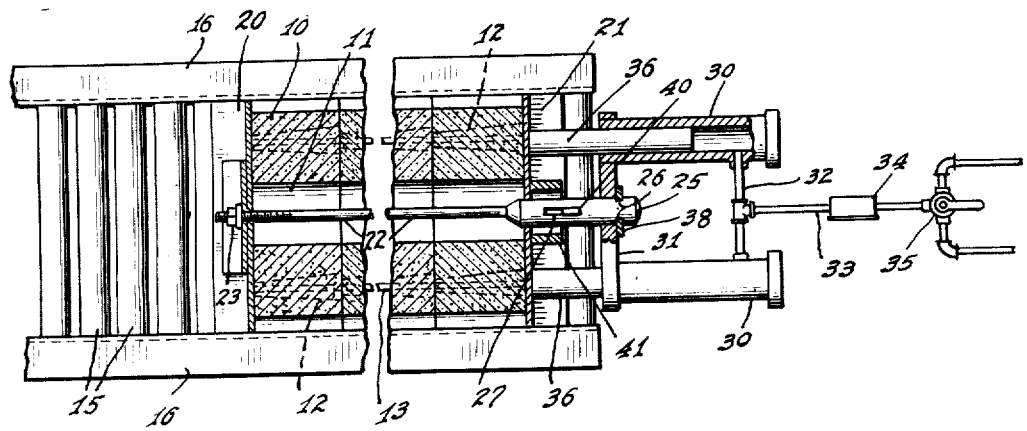
Fig. 1 is a plan view, in partial section, illustrating an assembled slab and the means employed for applying and maintaining the clamping effort.
Figure 2:
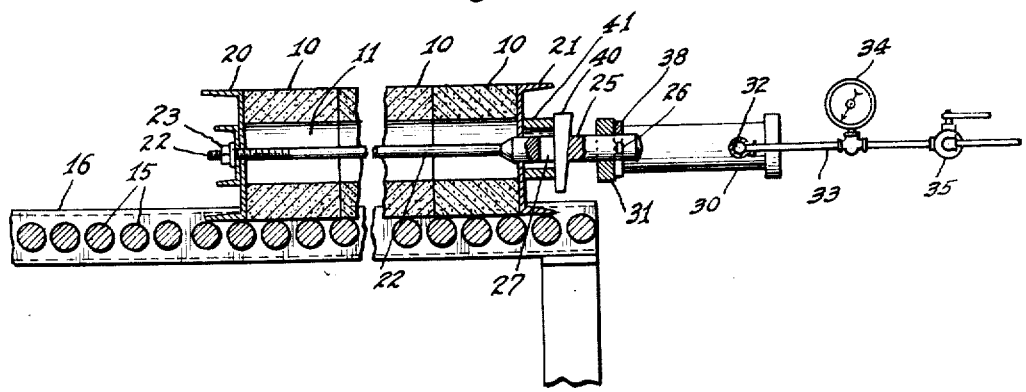
Fig. 2 is a vertical central section through the slab and clamping means shown in Fig. 1.

The slab shown in the drawing comprises a row of individual blocks 10 having central voids 11 and additional aligned openings 12, the latter serving to receive reinforcing rods 13 which are to be grouted in place. The blocks 10 are conveniently arranged in a row on a roller table having a series of horizontal, parallel, block-supporting rollers 15 mounted in horizontal side members 16 at least one of which conveniently extends upwardly beyond the upper surface of the rollers to serve as a straight-edge for use in aligning the blocks.

After blocks of the number necessary to make a beam or slab of the desired length have been arranged in a row on the roller table, clamping members 20 and 21, conveniently of channel iron, are disposed against the end faces of the end blocks. The clamping members 20 and 21 have openings which are aligned with each other and with the voids 11 for the reception of a clamp rod 22 extending for the full length of the beam and projecting beyond the two clamping members. At one end, the clamp rod 22 has a head or nut 23 engaging the outer face of the clamp member 20, while at its opposite end the clamp rod is provided with a head 25, conveniently of somewhat larger diameter than the rod itself. The head 25 is provided near its outer end with a pair of diametrically opposite grooves 26 and inwardly of such grooves with a diametrically extending slot 27, the purpose of which will hereinafter become apparent.

To apply clamping effort to the blocks 10, I preferably employ a hydraulic device in the form of a pair of hydraulic jacks 30 the two cylinders of which are rigidly interconnected by a cross member 31 having a central opening for reception of the head 25. At the opposite ends of the cylinders 30, their interiors are interconnected through a pipe 32 which is in turn connected to a supply line 33 for hydraulic pressure-fluid. The supply line 33 desirably includes, in addition to a flexible section permitting bodily movement of the interconnected jacks, a pressure gage 34 and a three-way valve 35 by which the supply and withdrawal of pressure fluid to and from the jacks 30 may be controlled. The pistons 36 of the jacks project from the cylinders in position to engage the outer face of the clamping member 21 when the head 25 of the clamp rod is received in the cross member 31. A split collar 38, having a diameter greater than that of the hole in the cross member and removably receivable in the notches 26, provides a thrust-transmitting connection between the cross member and the clamp rod.

With the slab assembled, the clamping members 20 and 21 in place, the clamp rod 22 extending longitudinally through the slab and through the clamping members, and with the clamp-rod head 25 projecting through the cross member 31, the split collar 38 is dropped into place in the notches 26 and the valve 35 is operated to admit pressure fluid to the jacks. The hydraulic pressure indicated by the gage 34 will constitute an accurate measure of the clamping effort applied to the slab, and when that clamping effort has reached the desired value, the valve 35 is operated to terminate the supply of pressure fluid to the jacks. There is then inserted into the slot 27 a wedge-like key 40 adapted to bear outwardly against the outer end of the slot and inwardly against abutments 41 provided on the adjacent clamp member 21. After such insertion, the key 40 is driven home, preferably until the pressure indicated by the gage 34 undergoes a decrease of predetermined extent, usually a decrease of about ten percent of the indicated pressure. Such a drop in pressure indicates that at least a substantial portion of the initial clamping effort exerted by the jack has been transferred to the wedge 40. When such transfer has been effected, the valve 35 is operated to relieve the jacks of pressure, and the split collar 38 is removed to permit separation of the jacks from the clamp rod. Thereafter, grouting is applied in the openings 12 to hold the reinforcing members 13 in place and the slab is ready for curing of such grouting. During curing, the wedge 40 remains in place to maintain the clamping effort. If the openings 12 which receive the reinforcing rods 13 are located wholly within the interior of the blocks so as to define a laterally confined passage extending for the length of the beam, the grouting may conveniently be applied through use of the apparatus shown in my copending application, Serial No. 361,983, filed June 16, 1953.

After the grouting has cured, the wedge 40 is driven out of the slot 27, thus making it possible to withdraw the clamp rod and remove the clamping members for reuse in the assembly of another slab.

I claim as my invention:

1. Apparatus for applying a longitudinal clamping effort to a slab comprising a row of blocks, said apparatus including first and second clamping members engageable with end blocks of the slab, a clamp rod connected to said first clamping member and extending for the length of the slab and beyond the second clamping member, power-operated means for forcing the two clamp members toward each other to apply clamping effort to the slab, a wedge having converging side faces respectively engaging said clamp rod and second clamping member and movable longitudinally of itself and transversely of said clamp rod after an initial slab-clamping operation of said power-operated means to urge said second clamping member toward the first clamping member and thereby relieve said power-operated means of at least a portion of its clamping effort, means for controlling the initial clamping effort exerted by said power-operated means, and means for measuring both such initial clamping effort and the extent to which such effort is relieved by operation of said wedge.

2. Apparatus as set forth in claim 1 with the addition that said power-operated means comprises a cylinder and piston disposed parallel to said clamp rod in position for the piston to engage the second clamping member, an abutment rigid with the cylinder and having an opening through which the clamp rod extends, and a removable thrust collar for transmitting thrust from the abutment to the clamp rod, said clamp rod having a pair of diametrically opposite, transverse grooves, said collar being split and receivable in said grooves.

3. A method of applying a controlled clamping effort to a slab gripped between two clamping members between which a power-operated clamping means and a second clamping means acts, comprising the steps of operating the power-operated means to apply a measured clamping effort to the slab and then operating the second clamping means to transfer to itself a portion of such predetermined clamping effort and to reduce to a measured extent the clamping effort applied by the power-operated means.

4. Apparatus for applying a longitudinal clamping effort to a slab comprising a row of blocks, said apparatus including first and second clamping members engageable with end blocks of the slab, a clamp rod connected to said first clamping member and extending for the length of the slab and beyond the second clamping member, hydraulic means acting between the clamp rod and second clamping member for forcing the two clamp members toward each other to apply clamping effort to the slab, said hydraulic means comprising a cylinder and piston disposed parallel to said clamp rod in position for the piston to engage the second clamp member, valve means for regulating the magnitude of such clamping effort, a gauge for measuring the magnitude of such clamping effort; releasable means for connecting said cylinder to said clamp rod, and a second releasable means for transmitting thrust from the clamp rod to the second clamping member independently of said hydraulic means.

5. Apparatus for applying a longitudinal clamping effort to a slab comprising a row of blocks, said apparatus including first and second clamping members engageable with end blocks of the slab, a clamp rod connected to said first clamping member and extending for the length of the slab and beyond the second clamping member, first and second clamping means operable successively and independently of each other between the clamp rod and second clamping member for imposing a controlled clamping effort on the slab, and means for measuring both the clamping effort imposed on the slab by operation of said first clamping means prior to operation of said second clamping means and the extent to which such clamping effort is reduced by operation of said second clamping means.

References Cited in the file of this patent

UNITED STATES PATENTS

| | | |
|---|---|---|
| 616,322 | Hatteberg | Dec. 20, 1898 |
| 893,413 | Merrals | Sept. 8, 1908 |
| 965,927 | Nichols | Aug. 2, 1910 |
| 1,094,400 | Burgess | Apr. 21, 1914 |
| 1,534,776 | Eisinga | Apr. 21, 1925 |
| 1,559,395 | Withers | Oct. 27, 1925 |
| 2,238,424 | McQuade | Apr. 15, 1941 |
| 2,423,652 | Kelley | July 8, 1947 |
| 2,511,761 | Barber et al. | June 13, 1950 |
| 2,579,533 | Alger | Dec. 25, 1951 |
| 2,644,497 | Wilmer et al | July 7, 1953 |
| 2,656,748 | Hugo et al. | Oct. 27, 1953 |

UNITED STATES PATENT OFFICE

CERTIFICATE OF CORRECTION

Patent No. 2,804,893 September 3, 1957

Harold R. Carper

It is hereby certified that error appears in the printed specification of the above numbered patent requiring correction and that the said Letters Patent should read as corrected below.

Column 3, lines 43 and 46, before "measured", each occurrence, insert -- predetermined --.

Signed and sealed this 19th day of November 1957.

(SEAL)
Attest:

KARL H. AXLINE
Attesting Officer

ROBERT C. WATSON
Commissioner of Patents